United States Patent
Thompson

(10) Patent No.: US 10,081,958 B2
(45) Date of Patent: Sep. 25, 2018

(54) APPARATUS FOR REPAIRING A POOL FITTING

(71) Applicant: Steven E Thompson, Brooksville, FL (US)

(72) Inventor: Steven E Thompson, Brooksville, FL (US)

( * ) Notice: Subject to any disclaimer, the term of this patent is extended or adjusted under 35 U.S.C. 154(b) by 335 days.

(21) Appl. No.: 14/496,205

(22) Filed: Sep. 25, 2014

(65) Prior Publication Data

US 2016/0090750 A1    Mar. 31, 2016

(51) Int. Cl.
  *E04H 4/14*   (2006.01)
  *B23P 6/00*   (2006.01)
  *E04H 4/12*   (2006.01)
  *E04H 4/00*   (2006.01)

(52) U.S. Cl.
  CPC .......... *E04H 4/14* (2013.01); *B23P 6/00* (2013.01); *E04H 4/00* (2013.01); *E04H 4/12* (2013.01); *Y10T 29/4943* (2015.01); *Y10T 29/4944* (2015.01); *Y10T 29/49732* (2015.01); *Y10T 29/49735* (2015.01)

(58) Field of Classification Search
  CPC ........ B23P 6/00; B23P 6/04; Y10T 29/49732; Y10T 29/49735; Y10T 29/4944; Y10T 29/4943; Y10T 29/49428; E04H 4/14; E04H 4/12; E03C 1/23; A47K 1/14
  USPC ........................................................... 4/295
  See application file for complete search history.

(56) References Cited

U.S. PATENT DOCUMENTS

| | | | |
|---|---|---|---|
| 2,273,984 A | 2/1942 | Osborn | |
| 3,167,122 A | 1/1965 | Lang | |
| 3,431,945 A | 3/1969 | Robillard | |
| 4,503,880 A * | 3/1985 | Hochman | F16L 55/132 137/15.03 |
| 5,771,937 A | 6/1998 | Collins | |
| 6,142,230 A | 11/2000 | Smalley | |
| 6,422,575 B1 | 7/2002 | Czaplicki | |
| 6,450,261 B1 | 9/2002 | Baugh | |
| 6,668,930 B2 | 12/2003 | Hoffman | |
| 8,695,128 B1 * | 4/2014 | Busbey | A61H 33/6063 4/507 |

* cited by examiner

*Primary Examiner* — Jermie Cozart

(57) ABSTRACT

An apparatus for repairing a fluid leak, thru a crack within the body of a pool return fitting, or in a pipe of close proximity to a pool return fitting, wherein an apparatus comprising of a cylindrical flow-thru elongated rubber plug, wherein a tube thru the center of the rubber plug is retained at one end by a flare in said tube or a locking nut over a uniquely shaped washer, and threaded on the other end, secured by a locking nut over a unique washer. in its compressed state, the rubber plug radially expands within the return line pipe and against a rubber extension ring inserted into the pool return fitting, sealing any leak occurring between the pool return fitting escutcheon and the return line pipe, wherein fluid may still pass thru the center tube. A trim ring is fitted around the locking nut of the threaded end tube, secured in place by a return eyeball, wherein the return eyeball is threaded female internally.

13 Claims, 3 Drawing Sheets

APPARATUS FOR REPAIRING A POOL FITTING

STATEMENT REGARDING FEDERALLY SPONSORED RESEARCH/DEVELOPMENT

Not Applicable.

BACKGROUND

This invention relates to the field of plumbing drain plugs generally, and more specifically to plumbing drain plugs as they relate to swimming pool leaks and swimming pool leak detection.

DISCUSSION OF PRIOR ART

The present invention most closely resembles plumbing drain plugs, especially flow-thru plumbing drain plugs. A flow-thru drain plug is a plug that can be secured in place thru a method of compression, and has an open center that allows fluid or gases to pass thru the apparatus, once inflated or expanded, and secure the plug in place. Flow-thru plugs are often used in the application of pressure testing and leak detection.

In the case of the present invention, an adaptation of a flow-thru plug is employed to solve the problem of a leaking or cracked fitting or pipe. In the past, a leak or crack, such as described, would require the cutting of a pool or spa decking to access a fitting or pipe for replacement. This requires the draining of the pool or spa, cutting and removal of concrete or other decking materials, digging down thru soils to the elevation of the plumbing, and then replacing the damaged fitting or pipe. Often this process requires means of creative plumbing techniques, and is very costly. This type of damage on a pool or spa most often occurs on a fiberglass shell pool or spa, but is not limited to other construction such as concrete or vinyl. Therefore it is advantageous to have available a method and apparatus by which the aforementioned damages may be repaired in a cost effective manner while also reducing the amount of disturbance to a deck and surrounding areas. It is to this need that the present invention is directed. After review of the background, summary and detailed description of the preferred embodiments, in conjunction with the drawings, specifications and claims, it should be apparent to anyone skilled in the field of Prior Art, that the present invention uniquely solves the need for a method and apparatus of repairing a pool fitting or pipe on a swimming pool, spa, fountain or pond when it otherwise is difficult or costly to do so.

SUMMARY

Wherein it is the nature of soils to shift, expand and contract, on occasion, a pool or spa fitting and plumbing can be stressed to the point of cracking and leaking. Repairs to such damages may be costly and disturb the continuity of the appearances of a deck or patio. Therefore, the need arises for a cost effective, quality repair method to address the said damages.

In the case of the present invention, an adaptation of a flow-thru plug is employed to solve the problem of a leaking or cracked fitting or pipe. Wherein the flow-thru plug is compressed between two cone-shaped washers that create a watertight seal at each end of the apparatus, of which the apparatus is positioned over a leak in a fitting or pipe, isolating the leak. The center tube of the apparatus then allows fluid to pass thru the apparatus. A trim ring and eyeball fitting give the exposed portion of the apparatus a finished appearance, completing the repair, whereby rendering the repair unnoticeable to a pool user. In the past, a leak or crack such as described would require the cutting of a pool or spa decking to access a fitting or pipe for replacement. This requires the draining of the pool or spa, cutting and removal of concrete or other decking materials, digging down thru soils to the elevation of the plumbing, and then replacing the damaged fitting or pipe. Often this process requires means of creative plumbing techniques, and is very costly. This type of damage on a pool or spa most often occurs on a fiberglass shell pool or spa, but is not limited to other construction methods, such as concrete or vinyl. Therefore it is advantageous to have available, a method and apparatus by which the aforementioned damages may be repaired in a cost effective manner, while also reducing the amount of disturbance to a deck and surrounding areas. It is to this need that the present invention is directed.

BRIEF DESCRIPTION OF THE DRAWINGS

In the figures, similar reference numbers refer to similar parts typical through various figures unless noted otherwise. Numerals with letter characters in addition to numerals such as "101A" or "101B" the letter character designations for reference numerals indicates that two similar parts or elements are present in the same figure. Letter character designations for reference numerals may be omitted when it is intended that a reference numeral encompass all parts having the same reference numeral in all figures.

For a more complete understanding of the present invention, and for further details and advantages thereof, reference is now made to the following detailed description taken in conjunction with the following drawings, in which.

DETAILED DESCRIPTION OF THE PREFERRED EMBODIMENTS

Figure 1:
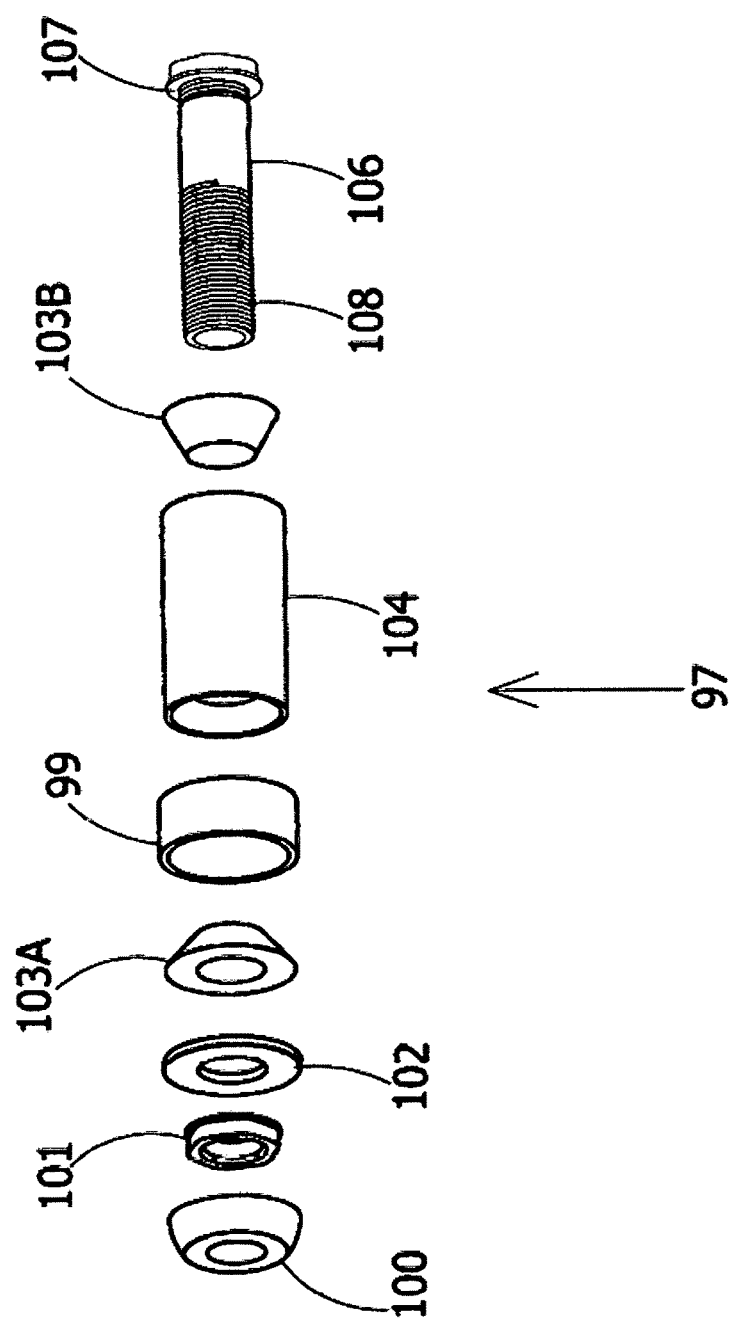
FIG. 1 is an exploded perspective drawing of the apparatus, whereby the rubber extension ring is depicted out of sequence for clarity, but goes around the uniquely shaped washer and the elongated rubber plug when in the compressed state, and the pool fitting and the return pipe is not depicted in FIG. 1.

In the descriptions which follow, like parts are marked throughout the specification and drawings with the same numerals, respectively. The drawing figures are not necessarily drawn to scale and certain figures may be shown in exaggerated or generalized form in the interest of clarity and conciseness.

The present invention is an apparatus that utilizes the preferred embodiment of first and second wedge shaped washers that are pressed against a flow-thru rubber plug seated over a threaded center tube, that when compressed by a locking nut, creates radial expansion more efficiently than a traditional expansion plug. The expansion is directed to the ends of the plug rather than the center of the plug as in with a traditional expansion plug. The apparatus is inserted into a pool line flush to a pool fitting and the locking nut tightened until the wedged washer is flush, against the rubber plug. An extension ring fills between the rubber plug and the inner surface of a pool return fitting. A sealant may be applied to the outer surface of the extension ring to ensure a watertight installation.

Various elements, features and benefits of the embodiments on the present invention will be more apparent with regard to the following description in conjunction with the included drawings. Those skilled in the art that the described embodiments of the present invention included herein are illustrative only and not limiting, and are presented in the way of example only. The features represented in this description may only be substituted with alternate features serving same or similar purposes, unless otherwise expressed. Therefore, other embodiments of modifications thereof are contemplated as falling within the scope of present invention defined herein and equivalents thereto. Presently disclosed embodiments, as well as features and properties thereof, are directed to provide a method and apparatus of repairing a pool fitting or piping. It should also become apparent from reviewing the drawings and descriptions, exemplary embodiments may allow a user to easily repair a pool return fitting or piping. A person of ordinary skill in the art will recognize the embodiments of the method and apparatus of repairing a pool fitting. In referring to the drawings of the invention of the method and apparatus of repairing a pool fitting:

FIG. 1 is an exploded perspective drawing of the apparatus 97 according to an exemplary embodiment of the invention. The exemplary embodiment of the invention may include a cylindrical flow-thru elongated rubber plug 104 hollow in the center; a center tube 106 flared 107 on one end and threaded 108 on the opposing end; an elongated rubber plug 104 wherein a center tube 106 is seated thru the hollow center of the rubber plug 104; a center tube 106 retained at one end by a uniquely shaped washer 103B, flat on one side and coned on the other side, seated against a flare 107 at the end of the center tube 106; a center tube 106 retained on the threaded end 108 by a locking nut 101 over a uniquely shaped washer 103A, flat on one side and coned on the other side; a trim ring 102 fitted over the unique washer 103A, around the locking nut 101; an extension ring 99 between the inside of the fitting 98 (not depicted in FIG. 1; for clarity) and the rubber plug 104; a pool return eyeball 100, wherein internal female threading enables said eyeball 100 to be mounted onto the threaded end 108 of the center tube 106, thus retaining the trim ring 102 in place; a method of installation of the present apparatus 97. The internal areas of a pool return fitting 98, and the first several inches of the pool return line 105 (not depicted in FIG. 1; for clarity) of which is connected to the said fitting 98, are lightly coated with a sealant such as silicone, and wherein the apparatus 97, when assembled, is inserted into the fitting 98 thru the pool return fitting into the return pipe 105, and tightened to a point by which a water-tight seal is created on both sides of the apparatus 97, thus isolating any leak due to a crack 90 in a pipe or fitting, between the two opposing ends of the apparatus 97, whereby fluid is allowed to flow thru the center tube 106 of the apparatus 97.

Figure 2:
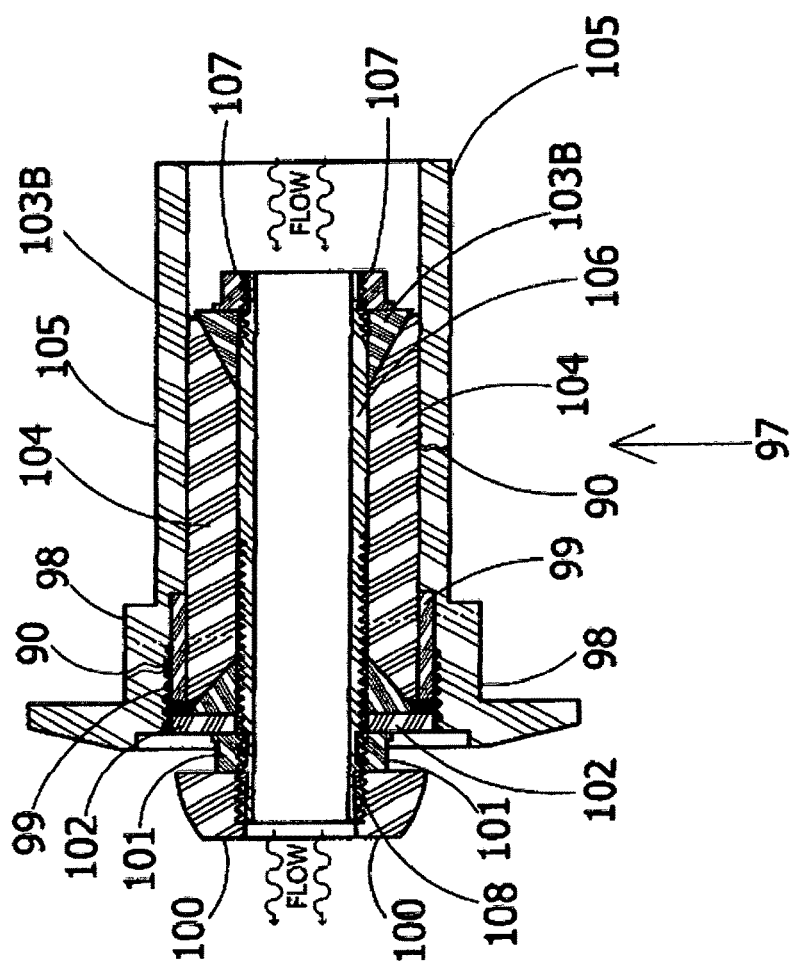
FIG. 2 is a sectional view of the apparatus of FIG. 1 in place in a pool return fitting and pipe in an uncompressed state.

FIG. 2 is a sectional view of the apparatus 97 of FIG. 1 in place in a pool return fitting 98 and return pipe 105 whereby the apparatus 97 is in an uncompressed state. The exemplary embodiment of the invention may include a cylindrical flow-thru elongated rubber plug 104 hollow in the center; a center tube 106 flared 107 on one end and threaded 108 on the opposing end; an elongated rubber plug 104 wherein a center tube 106 is seated thru the hollow center of the rubber plug 104; a center tube 106 retained at one end by a uniquely shaped washer 103B, flat on one side and coned on the other side, seated against a flare 107 at the end of the center tube 106; a center tube 106 retained on the threaded 108 end by a locking nut 101 over a uniquely shaped washer 103A, flat on one side and coned on the other side; a trim ring 102 fitted over the unique washer 103A, around the locking nut 101; an extension ring 99 between the inside of the fitting 98 and the rubber plug 104; a pool return eyeball 100, wherein internal female threading enables said eyeball 100 to be mounted onto the threaded 108 end of the center tube 106, thus retaining the trim ring 102 in place; a method of installation of the present apparatus 97. The internal areas of a pool return fitting 98, and the first several inches of the pool return line 105 of which is connected to the said fitting 98, are lightly coated with a sealant such as silicone, and wherein the apparatus 97 is shown inserted into the pool return fitting 98 and the pool return pipe 105. When compressed by tightening the locking nut 101 onto the threads of the center tube 106, the uniquely shaped washers 103A, 103B, squeeze together, forcing the elongated rubber plug 104 to expand radially, thus coming into contact with the extension ring 99 and the wall of the return pipe 105. Further the extension ring 99 then is forced against the inner walls of the return fitting 98, thereby creating a seal at both ends of the apparatus 97. The direction of water flow, thru the apparatus 97, is indicated in the drawing. Two examples of a crack 90 are depicted; one in the pool return fitting 98 and one on the pool return pipe 105, to indicate typical crack 90 locations commonly found in swimming pools and spas.

Figure 3:
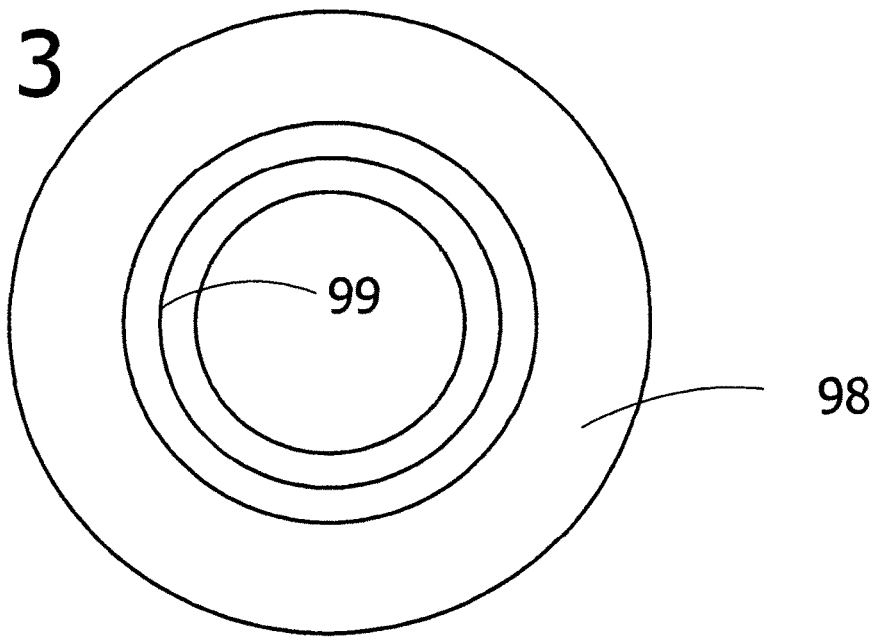
FIG. 3 is a front elevation of a pool return fitting showing the rubber extension ring seated into the fitting.

FIG. 3 is a front elevation of a pool return fitting 98 showing the rubber extension ring 99 seated into the pool return fitting 98.

Figure 4:
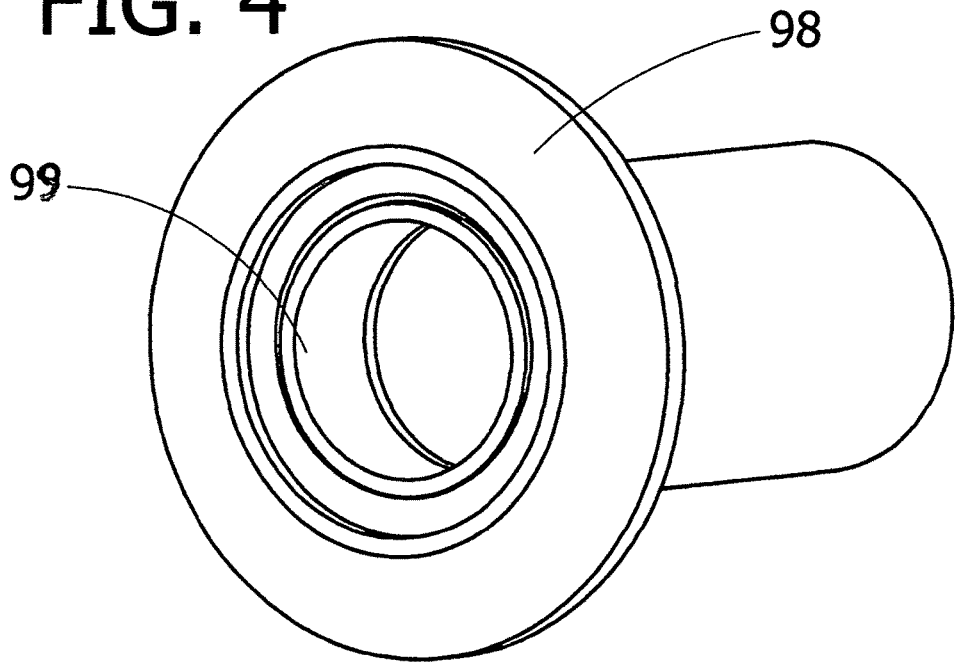
FIG. 4 is a perspective view of a pool return fitting showing the rubber extension ring of FIG. 3 seated into the fitting.

FIG. 4 is a perspective view of a pool return fitting 98 showing the rubber extension ring 99 of FIG. 3 seated into the pool return fitting 98.

The method and apparatus of repairing a pool return fitting have been described using detailed descriptions of the embodiments that demonstrate by way of example and do not limit the scope of the present invention. Some embodiments of the present invention may only be used in some combinations of the present apparatus and method features. Variations and or combination of features of the embodiments will occur to persons of the art.

It will be appreciated by persons skilled in the art that the method and apparatus of the present invention is not limited by what was particularly described herein above. Rather, the scope of the method and apparatus for repairing a pool fitting and/or piping is defined by the attached claims.

The invention claimed is:

1. An apparatus for a repairing a fluid leak through a crack within the body of a pool return fitting, or in a pipe of close proximity to the pool return fitting, wherein the apparatus comprises: a cylindrical flow-thru elongated rubber plug which is hollow in the center; a center tube flared on one end and threaded on an opposing end wherein the elongated rubber plug is seated over the center tube; a first uniquely shaped washer being flat on one side and coned on the other side, seated over the threaded end of the center tube with the coned side against the rubber plug; a locking nut adjacent a second uniquely shaped washer; a trim ring fitted against the second uniquely shaped washer; an extension ring seated between the inside of the pool return fitting and the rubber plug; a pool return eyeball, wherein internal female threading enables said return eyeball to be fastened onto the center tube threading, thus retaining the trim ring in place; and wherein the apparatus is inserted flush into the pool return fitting, the locking nut is tightened until the second uniquely shaped washer is pressed flush against the cylindrical flow-thru elongated rubber plug, and a sealant may be applied to the outer edge of the extension ring to ensure a watertight seal, and the return eyeball is threaded over the center tube to create a finished appearance.

2. The apparatus of claim 1 wherein the internal areas of the pool return fitting, and the first several inches of a pool return line of which are connected to said fitting, are lightly coated with a sealant such as silicone, and wherein the apparatus is inserted into the pool return fitting thru the return line, and tightened to a point by which a water-tight seal is created on both sides of the apparatus, thus isolating any leak between the two opposing ends of the apparatus, whereby fluid is allowed to flow through the apparatus.

3. The apparatus of claim 1 wherein the flared end of the center tube retains the first uniquely shaped washer which secures an end of the center tube against the corresponding end of the rubber plug.

4. The apparatus of claim 3 wherein the first and second uniquely shaped washers are comprised of:
stainless steel, a corrosion-resistant metal or any other material possessing properties of high strength and is corrosion-resistant.

5. The of claim 3 wherein the center tube is made of:
stainless steel, a corrosion-resistant metal or any other material possessing properties of high strength and is corrosion-resistant.

6. The apparatus of claim 1 wherein the second uniquely shaped washer and the locking nut are tightened against one another onto the threaded end of the apparatus, making contact with an end of the rubber plug thereby compressing the plug, and creating radial expansion of the plug.

7. The apparatus of claim 6 wherein the locking nut is made of:
stainless steel, a corrosion-resistant metal or any other material possessing properties of high strength and is corrosion-resistant.

8. The apparatus of claim 6 wherein the first and second uniquely shaped washers are made of:
stainless steel, a corrosion-resistant metal or any other material possessing properties of high strength and is corrosion-resistant.

9. The apparatus of claim 1 wherein the trim ring is plastic.

10. The apparatus of claim 1 wherein the apparatus can be installed with or without water in a pool.

11. The apparatus of claim 1 wherein the elongated rubber plug is made of a compressible rubber material.

12. The apparatus of claim 11 wherein the compressible rubber flow-thru plug is cylindrical, hollow in the center to receive the center tube, and which the shape of the rubber plug is not limited to being smooth in texture, but may also be ribbed or any other texture that would facilitate radial expansion for the purpose of creating a water-tight seal while under compression.

13. The apparatus of claim 1 wherein the extension ring is made of rubber and is seated between the outside surface of the rubber plug and the inside surface of the pool return fitting to infill the threaded fitting area of the pool return fitting and seal the apparatus against the pool return fitting.

\* \* \* \* \*